United States Patent [19]

Kiri

[11] Patent Number: 4,891,844
[45] Date of Patent: Jan. 2, 1990

[54] RADIATION IMAGE DETECTING SYSTEM

[75] Inventor: Motosada Kiri, Kyoto, Japan

[73] Assignee: Shimadzu Corporation, Kyoto, Japan

[21] Appl. No.: 173,268

[22] Filed: Mar. 25, 1988

[30] Foreign Application Priority Data

Mar. 25, 1987 [JP] Japan ................................ 62-71097

[51] Int. Cl.⁴ .......................................... G06K 9/28
[52] U.S. Cl. ................................. 382/6; 250/363.06;
  250/370.09; 358/111; 378/62; 378/99
[58] Field of Search ....................... 250/363.06, 370.08,
  250/370.09, 361; 382/6, 68; 350/162.16;
  378/62, 99, 2, 11; 358/111

[56] References Cited

U.S. PATENT DOCUMENTS

| | | | |
|---|---|---|---|
| 3,703,724 | 11/1972 | Thomas | 350/162.16 |
| 3,840,747 | 10/1974 | Macovski | 250/363.06 |
| 4,146,295 | 3/1979 | Fonrojet et al. | 250/363.06 |
| 4,209,780 | 6/1980 | Fenimore et al. | 382/68 |
| 4,228,420 | 10/1980 | Fenimore et al. | 382/68 |
| 4,246,483 | 1/1981 | Weiss et al. | 378/2 |
| 4,360,797 | 11/1982 | Fenimore et al. | 382/65 |
| 4,389,633 | 6/1983 | Fenimore | 250/363.06 |
| 4,688,242 | 8/1987 | Ema | 378/62 |
| 4,734,588 | 3/1988 | Akai | 250/370.09 |
| 4,755,681 | 7/1988 | Oka et al. | 250/370.09 |
| 4,809,309 | 2/1989 | Beekmans | 358/111 |

*Primary Examiner*—Leo H. Boudreau
*Assistant Examiner*—Yonnie Jung
*Attorney, Agent, or Firm*—Koda & Androlia

[57] ABSTRACT

A radiation image detecting system with the image divided into pixels. In this system the pixel signals are detected with a method of coded aperture. All the pixels are grouped into equal-sized areas, each of which includes the same number of pixels forming a square sub-matrix of pixels. The pixel signals corresponding to the pixels contained in the above sub-matrix are obtained in the form of coded signals by being detected a plurality number of times successively with a plurality of sensor groups which are made purposefully different from one another in the number, arrangement pattern and size of the sensors.

1 Claim, 2 Drawing Sheets

RADIATION IMAGE DETECTING SYSTEM

BACKGROUND OF THE INVENTION

The present invention relates to a radiation image detecting system having the radiation image receiving plane constituted of a plurality of two-dimentionally arrayed raddiation sensors.

In a typical example of the system for electronically detecting a radiation image with the image divided into pixels, the number of pixels often reaches the order of $10^6$, provided that a typical image receiving area of $30 \times 30$ cm$^2$ is required with the pixels having a very small irradiation area of the order of $10^{-1}$ mm$^2$ to comply with a required resolving power of image detection. In such a case it makes the system very complex and expensive to provide such a numerous number $10^6$ of radiation sensors in correspondence to the number of pixels.

A possible conventional measure to overcome the above disadvantage and difficulty is to scan the imaginary plane of image receiving with a single radiation sensor two-dimensionally or with a series of linearly arrayed radiation sensors one-dimensionally (in the direction vertical to the array). However, such a scanning method by a single sensor or arrayed sensors has a decisive disadvantage that not only it takes a long time to complete the scanning over the entire area of the image receiving plane, but also the efficiency of radiation detection is very low because the radiation irradiating the image receiving plane is wasted except for a successively traveling spot or linear region where the scanning single sensor or sensor array is being irradiated. Suppose the case where a series of n linearly arrayed sensors one-dimentionally scans the entire area of an image receiving plane divided into n×n pixels, the efficiency of radiation detection is 1/n. In case where the same area is two-dimansionally scanned by a single sensor, the efficiency is further decreased to 1/n$^2$.

OBJECTS AND SUMMARY OF THE INVENTION

The present invention aims at solving the above disadvantages and difficulties accompanying the conventional system for electronically detecting a radiation image with the image divided into pixels, and makes it a principal object to provide an improved system for electronically detecting a radiation image with the image divided into pixels, the system being improved so as to complete a radiation image detection in a short time at a relatively high efficiency of radiation detection without completely filling up all the pixels with a corresponding number of radiation sensors.

Another object of the present invention is to actualize such an improved system by employing the so-called coded aperture method.

According to the present invention, all the pixels supposed to form a pixel matrix are grouped into equal-sized areas, each of which includes the same number of pixels forming a square sub-matrix of pixels. The pixel signals corresponding to the pixels contained in the above sub-matrix are obtained in the form of coded signals by being detected a plurality number of times successively with a plurality of sensor groups which are made purposefully different from one another in the number, arrangement pattern and size of the sensors. Each sensor in every sensor group, in general, covers a plurality of pixels, but the sonsors in some sensor groups does not completely cover all the pixels included in the sub-matrix with some pixels left in a state that no signal is detected therefrom. The output signals from sensors are arithmetically treated with a computing means so as to finally give a radiation image consisting of of pixels supposed originally on the image receiving plane. The details of the function is made clear later in conjunction with the description of some embodiments of the invention.

In the radiation image detecting system based on the present invention, the number of pixels constituting the image receiving plane is made much smaller than that of the supposed pixels, since, as is mentioned above, some sensors respectively take charge of more than one pixels. A decreased number of the sensors causes the constitution of both the image receiving plane and the electronics concerned to be simple. Nevertheless, the the efficiency of radiation detection, as will be described later, is kept at a relatively high value, through lower than the maximum value of unity expected when the image receiving plane consists of sensors the number of which is equal to the number of pixels.

The present invention can not only be employed in the detection of a plane radiation image in a wide range of wave lengths including gamma rays, X-rays, visible rays and infrared rays, but also applied to the detection if tomographic image in a similar range of wavelengths.

BRIEF DESCRIPTION OF THE DRAWINGS

In the following the present invention is described in further detail on reference to the accompanying drawings in which.

DETAILED DESCRIPTION OF THE INVENTION

Figure 1A:
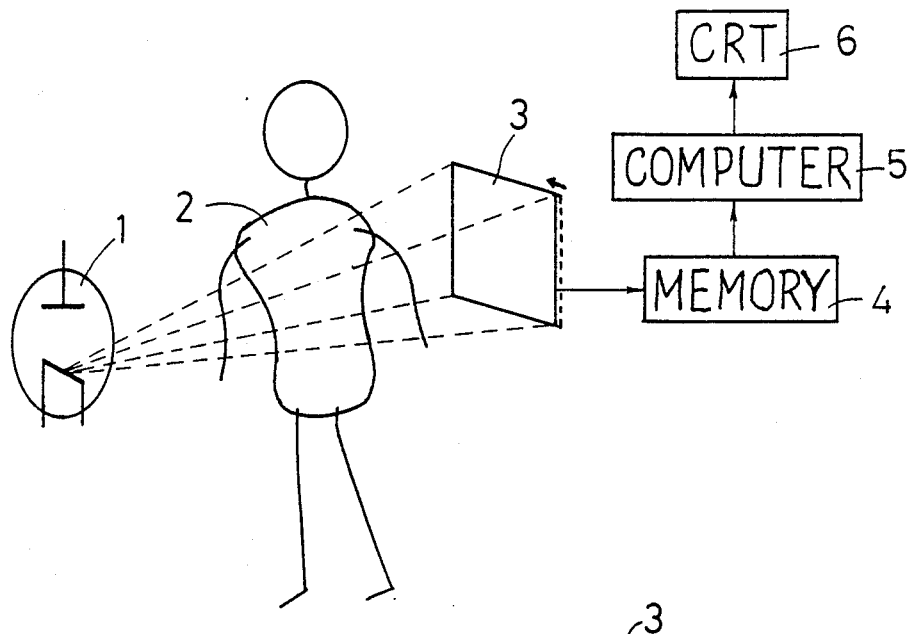
FIGS. 1(A) and (B) respectively illustrate a block diagrammatic consitution of an embodiment of the invention and the relation between the pixels supposed and radiation sensor arrangement employed in the embodiment.
Figure 1B:
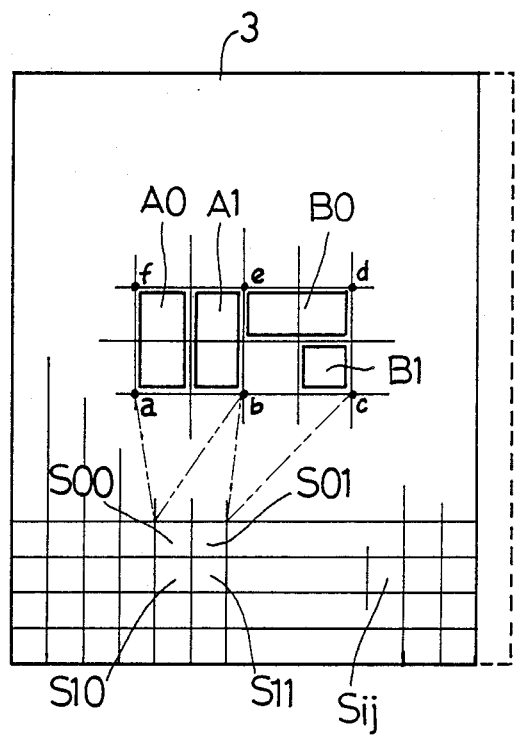

Referring to FIG. 1(A), which block diagrammatically shows the consitution of an embodiment of the present invention as applied to X-ray radiograph, X-rays radiated from an X-ray source 1 penetrates a patient 2 as an object and projects an X-ray image on an image receiving plane 3, which consists of X-ray sensors arranged as described later with FIG. 1(B). The output signals from the sensors are stored in a memory 4 and then arithmetically treated by a microcomputer 5 so as to give X-ray image signals. The X-ray signals are transferred to a CRT 6 to display thereon the X-ray image projected on the plane 4 in a visible form. On the image receiving plane 4 there is supposed, as illustrated in FIG. 1(B), a pixel plane 3a consisting of many small pixel areas Sij. On the other hand the image receiving plane 3 itself is made up of different-sized X-ray sensors made to purposefully correspond to the pixel areas, as is described in the following with two sensor groups exemplified. The two sensor groups, which are respectively specified by two symbol groups a-b-e-f and b-c-d-e, contain sensors A0, A1 and B0, B1, respectively.

With such arrangement of sensors, in the first place an X-ray image detection is carried out with the sensor group a-b-e-f made to correspond to pixel areas S00, S01, S10 and S11. In this case the sensor A0 and A1 respectively cover pixels S00, S10 and S01, S11. In the next place the second image detection is carried out with the sensor group b-c-d-e made to correspond to the same pixel areas S00, S01, S10 and S11. In this second case the sensors B0 and B1 cover two pixels S00, S01 and one pixel S11, respectively. Pixel S10 is left uncovered. In the above two successive detection operations, the output signanls (A0), (A1), (B0) and (B1) are given by the four equations shown below:

$$(A0) = 1x(S00) + 0x(S01) + 1x(S10) + 0x(S11)$$

$$(A1) = 0x(S00) + 1x(S01) + 0x(S10) + 1x(S11)$$

$$(B0) = 1x(S00) + 1x(S01) + 0x(S10) + 0x(S11)$$

$$(B1) = 0x(S00) + 0x(s01) + 0x(S10) + 1x(S11),$$

where the symbols (S00) and the like represent the signals supposed to be outputted from the pixel areas S00 and the like if they were covered by respective single sensors. The above simultaneous linear equations can easily be solved by the microcomputer 6 to give:

$$(S00) = (B0) + (B1) - (A1)$$

$$(S01) = (A1) - (B1)$$

$$(S10) = (A0) + (A1) - (B0) - (B1)$$

$$(S11) = (B1).$$

According to this embodiment, the number of sensors is four for eight pixels, while the efficiency of radiation detection is kept at a relatively high value of $\frac{7}{8} = 87.5\%$.

Figure 2:
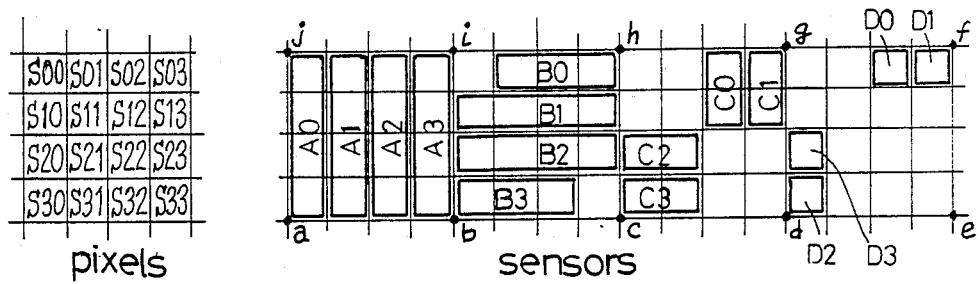
FIG. 2 shows the sensor arrangement on the image receiving plane employed in another embodiment of the invention.
Figure 3:
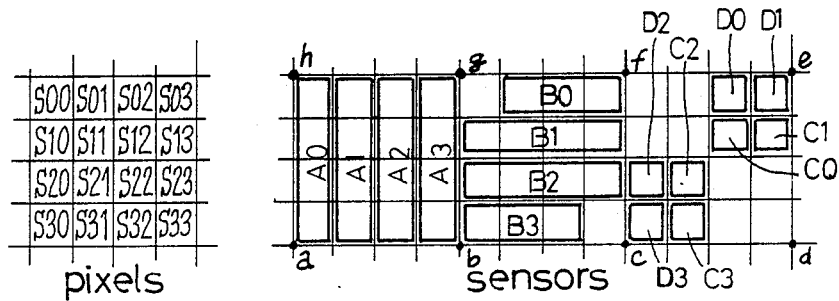
FIG. 3 shows the sensor arrangement on the image receiving plane employed in a further embodiment of the invention.

The present invention can be embodied with other various combinations of pixel group and sensor groups. Two examples of the combination are shown in FIGS. 2 and 3. In the combination shown in FIG. 2 the efficiency of radiation detection is 65.625%, while it is 79.17% in the embodiment employing the combination shown in FIG. 3.

Figure 4:
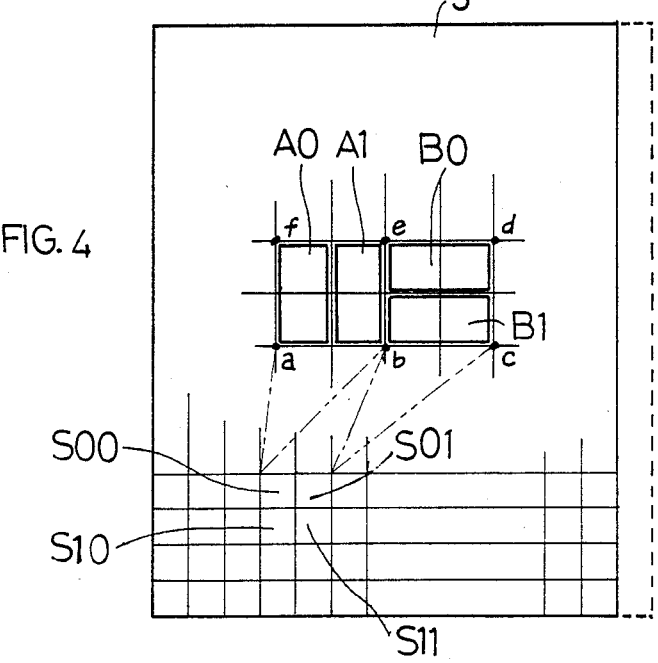
FIG. 4 shows an example of the sensor arrangement which can not effect the invention.

In the present invention it is important to select the size and arrangement of the sensors so that the determinat constituted with the coefficients 0 and 1 in the simultaneous equations similar to those given above may not be zero, because, if the determinant is zero, the equations can not be solved. FIG. 4 shows an example of such sensor groups as make the determinant to zero.

It is not to be mentioned that the present invention can further be applied to the radiation image detecting system in which the pixels are arranged in the form of non-matrix.

I claim:

1. A radiation image detecting system in which a radiation image projection plane divided into pixel domains for the purpose of detecting a radiation image with the same divided into pixels by placing at said radiation image projection plane a radiation image detecting plate on which a numerous number of radiation sensors are arrayed, said radiation image detecting system comprising:

a radiation image detecting plate divided into rows and columns of the same-sized sensor domains, each of which consists of the same-sized sensor subdomains, all of which are to correspond to one predetermined partial area supposed on said radiation image projection plane, each of said same-sized sensor subdomains including at least some number of radiation sensors different in number, size and distribution depending on each of said same-sized sensor subdomains;

a sensor displacing means for displacing said radiation image detecting plate stepwise so that each of said same-sized sensor subdomains may be successively brought to said one predetermined partial area supposed on said radiation image projection plane;

a memory for storing the output signals from said radiation sensors each time said radiation image detecting plate is displaced; and a computing means for solving the simultaneous equations given the output signals from said radiation sensors.

* * * * *